United States Patent

Niegel et al.

[11] Patent Number: 6,015,236
[45] Date of Patent: Jan. 18, 2000

[54] THIN-WALLED PLAIN BEARING

[75] Inventors: Fritz Niegel; Guido Schöneich, both of Oestrich-Winkel; Gerhard Arnold, Heidenrod; Werner Lucchetti, Walluf, all of Germany

[73] Assignee: Glyco-Metall-Werke Glyco B.V. & Co.KG, Wiesbaden, Germany

[21] Appl. No.: 09/150,807

[22] Filed: Sep. 10, 1998

[30] Foreign Application Priority Data

Sep. 11, 1997 [DE] Germany ............... 197 39 929

[51] Int. Cl.⁷ .................. F16C 9/02; F16C 33/02
[52] U.S. Cl. ........................... 384/276; 384/294
[58] Field of Search ................ 384/276, 286, 384/287, 288, 294, 295

[56] References Cited

U.S. PATENT DOCUMENTS 2,905,511  9/1959  Cerness .......................... 384/294
4,073,550  2/1978  Yahraus ........................... 384/288
4,889,435  12/1989  Gojon ............................. 384/276

*Primary Examiner*—Thomas R. Hannon
*Attorney, Agent, or Firm*—Reising, Ethington, Barnes, Kisselle, Learman & McCulloch, P.C.

[57] ABSTRACT

A plain bearing shell ($2a'$, $2b'$) exhibits a reduction in oil carbon formation on the plain bearing backing and an improvement in plain bearing interference fit during operation through a decrease in the relative movement between bearing backing and receiving bore. The ratio of the effective wall thickness $W_{eff}$ to the external bearing diameter D is defined by $0.012 \leq W_{eff}/D \leq 0.02$. The ratio of the installation free spread S to the external bearing diameter D is defined by: $0.025 \leq S/D \leq 0.05$.

2 Claims, 2 Drawing Sheets

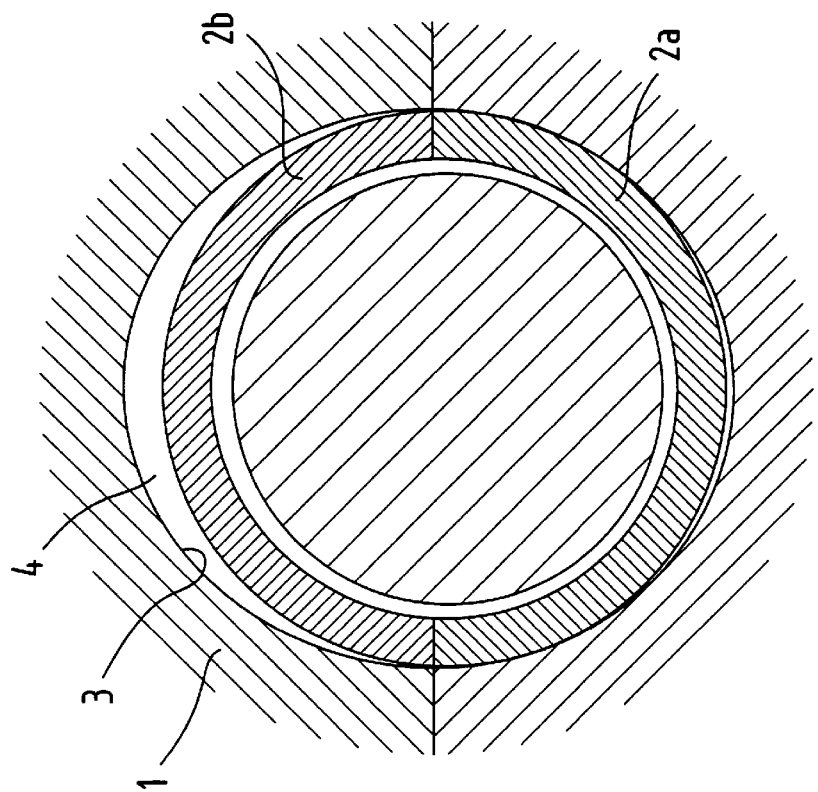
Fig. 1 - PRIOR ART
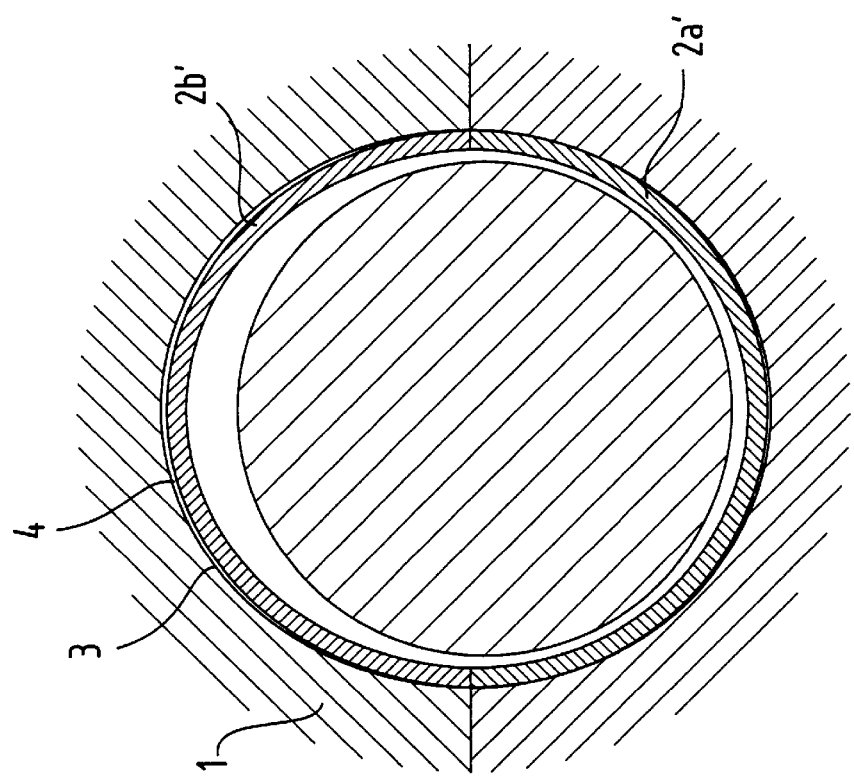
Fig. 3

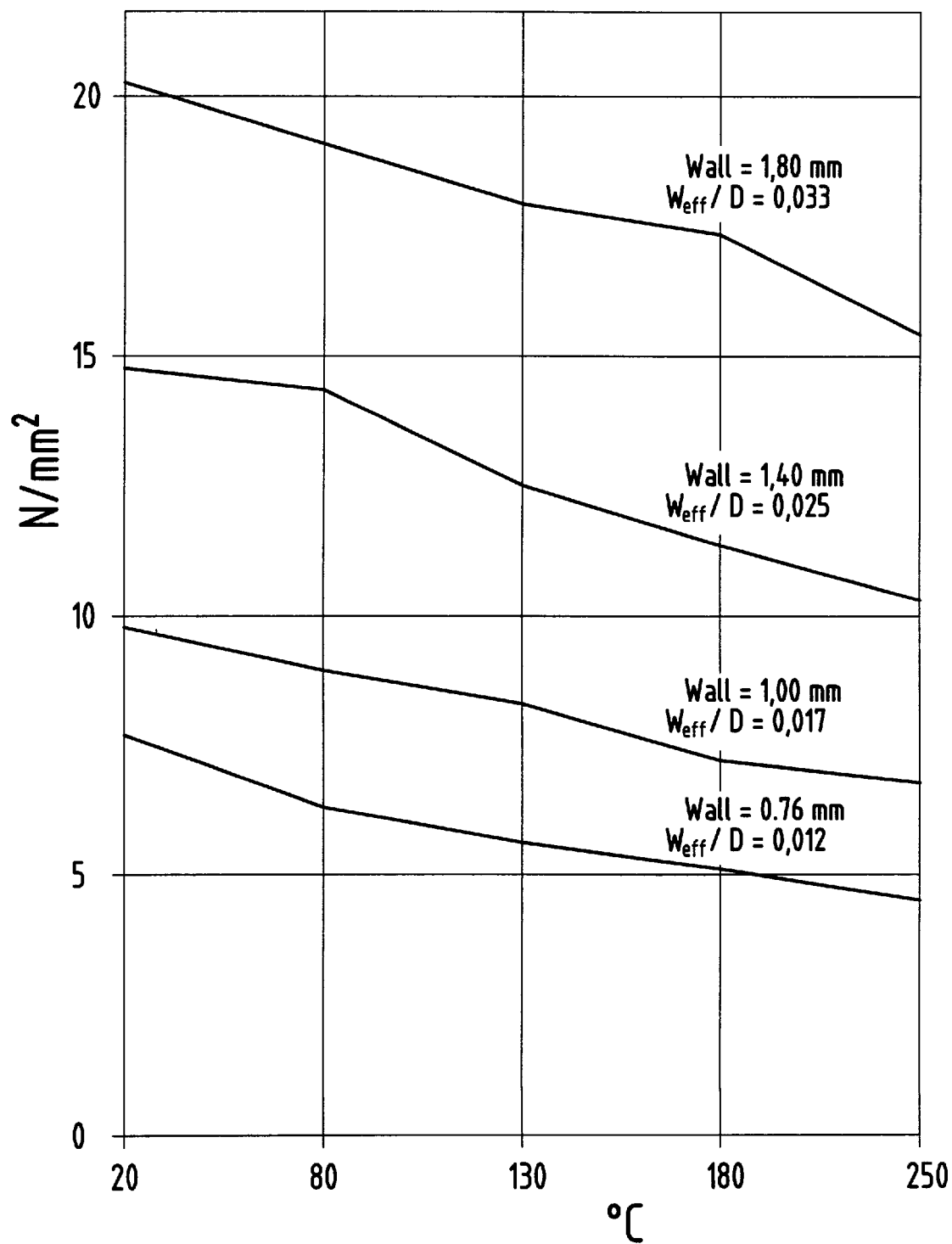
Fig. 2 Variation in radial pressure
Plain bearing clamped in connection rod (t = 20 hrs)
Uniform initial state $\sigma_L = 310$ N / mm$^2$

THIN-WALLED PLAIN BEARING

BACKGROUND OF THE INVENTION

1. Field of the Invention

The invention relates to a plain bearing shell with bearing backing and single- or multi-layer bearing material applied thereto.

2. Description of Related Art

In internal combustion engines, light-weight construction methods, i.e. the use of light connecting rods and bearing caps and the use of light metals, are preferable as they enable energy savings to be made. A consequence of this is that the bore for accommodating the plain bearing becomes widened and deformed under load, whereby relative movement occurs between the bearing backing and the receiving bore. In order to secure the bearing shell in the receiving bore so that it does not rotate, the external diameter of the bearing shell is designed to be larger than the internal diameter of the receiving bore. When the bearing is installed in the housing, tension arises as a result of the oversize of the bearing shell, said tension taking the form of compressive strain $\sigma_L$ in the tangential direction and radial pressure $\rho_r$ between the bearing and the housing, the latter determining an interference fit.

When the engine is running, however, the interference fit deteriorates as a result of deformation of the housing and creeping of the steel in the bearing shell as a consequence of the high temperature, whereby the radial pressure diminishes. According to "Die Berechnung des Preβsitzes von Gleitlagerschalen", Dr. E. Römer, offprint from MTZ, volume 22, issue 2, in the case of connecting-rod bearings the radial pressure should therefore amount on average to at least approximately 10 N/mm² in order to ensure a reliable interference fit of the bearing during operation.

However, in the design of the bearing shell it is also necessary to take into account the compressive strain $\sigma_L$, which is greater by approximately the factor 20 than the radial pressure $\rho_r$ and is thus responsible for the actual stressing of the bearing.

Since loading depends on the cross-sectional area of the bearing, it follows that the stress increases if the degree of oversize remains constant and wall thickness is diminishable.

For this reason, only bearing shells with a total wall thickness ≧1.4 mm (housing bore diameter of 50 mm, i.e. the ratio of the effective wall thickness to the external bearing diameter $W_{eff}/D$ is greater than 0.02) have hitherto been used. The effective wall thickness $W_{eff}$ is the sum of the thickness of the individual layers, which are standardised in such a way as to take into account the maximum modulus of elasticity of the multi-layer system.

From "Die Berechnung des Preβsitzes von Gleitlagerschalen", Dr. Erich Römer, offprint from MTZ, volume 22, issue 2 and 4/1961 and "Aspekte zur Gleitlagerung von Nutzfahrzeug-Dieselmotoren", Dr. Erich Römer, offprint from MTZ, 79th volume, No. 9/77, it is known that the ratio $W_{eff}/D$ is from 0.03 to 0.05 or, in the case of connecting-rod bearings, the ratio of the wall thickness W to D is from 0.02 to 0.03.

In the case of connecting-rod bearings, the residual radial pressure is of particular significance, since, in this instance, the deformation of the receiving bore is very great owing to varying tensile and compressive loads.

When an engine is running, extremely rapid load variation arises owing to the piston moving in the axial direction. This means, as is shown in FIG. 1, that a conventional bearing shell 2a, 2b cannot continue to follow the deformation movement of the bore 3 adequately and the bearing backing momentarily becomes detached from the housing 1.

This leads to two problems:

1. As a result of the momentarily arising gap 4, oil penetrates between bearing backing and receiving bore 3. If the gap closes again, a residual amount of oil is shut in, whereby in time oil carbon builds up on the bearing backing.
2. As a result of the deformation, the bearing shell 2a, 2b no longer fully adjoins the housing 1, whereby the radial pressure is no longer able to act to its full extent. In order then to secure the bearing against rotation in the housing 1, the radial pressure must exhibit the above-described minimum value.

For this reason, in the prior art known hitherto, wall thicknesses were maintained which would ensure a minimum radial pressure, in order to reduce oil carbon build-up on the bearing backing. On the other hand, the bearing backing was machined in diverse ways, in order to divert the oil penetrating between bearing backing and receiving bore and thereby to reduce oil carbon build-up.

However, these bearings were extremely complex to manufacture and, moreover, were not particularly effective.

A plain bearing arrangement of this type with a thin-walled plain bearing element is known from DE 33 28 509 C1. To prevent the build-up of oil carbon between the backing surface and the receiving bore, fine channels are formed on the bearing backing to act as drainage channels for liquid lubricant. The drainage channels are intended to make it possible for the lubricant to escape towards the free ends of the bearing surface during relative movement. The pressure and temperature conditions required for oil carbon production are thereby avoided.

U.S. Pat. No. 2,905,511 describes bearing shells which in part have a total wall thickness of only 1.07 mm and in addition also comprise grooves or recesses, no indication being given as to external diameter, however.

The provision of drainage grooves or recesses makes the manufacturing process highly complex, however.

GB 256 200 discloses a similar attempt at solving the problem, according to which the bearing backing has projections which rest against the bearing bore. The bearing shell is altogether more flexible owing to the reductions in wall thickness between the projections.

Another solution is described in EP 0 304 109. To ensure the interference fit in the bearing housing under all internal combustion engine operating conditions, a 0.5 to 5 μm thick metal protective layer is provided on the back of the steel backing layer.

SUMMARY OF THE INVENTION

The object of the invention is to provide a plain bearing shell which exhibits a reduction in oil carbon formation on the plain bearing backing and an improvement in the plain bearing interference fit during operation through a reduction in the relative movement between bearing backing and receiving bore.

This object is achieved with a plain bearing shell in which the ratio of the effective wall thickness $W_{eff}$ to the external bearing diameter D is defined by: $0.012 \leq W_{eff}/D \leq 0.02$ and in which the ratio of the installation free spread S to the external bearing diameter D is defined by: $0.025 \leq S/D \leq 0.05$.

In the case of thick-walled bearing shells, a radial pressure of at least approximately 10 N/mm² was considered necessary, to ensure that the bearing shell continued to fit closely at least in the area of the partial surfaces after deformation of the receiving bore and thus on the one hand to prevent oil carbon formation in this area and rotation of the entire bearing shell. Since radial pressure of more than 10 N/mm² is unrealisable in the case of the extremely thin-walled bearing shells according to the invention, prejudice would dictate that these bearing shells would be altogether unusable.

However, it has surprisingly emerged that the extremely thin-walled bearing shells follow the deformation of the receiving bore, owing to their greater elasticity, and thus fit closely everywhere in the receiving bore, such that an altogether lower radial pressure suffices as security against rotation owing to the larger bearing face. It has been shown that radial pressures of 8 N/mm², for example, are adequate to prevent rotation of the bearing shell during operation. The bearing shell does not become detached from the bearing bore, such that no gap or only a slight gap arises at the back through which oil may flow. Oil carbon formation on the bearing backing is thereby prevented or at least considerably reduced.

The extremely thin-walled plain bearing shell is very elastic and may follow well the deformation of the receiving bore resulting from high tensile and compressive load caused by ignition and centrifugal forces arising in internal combustion engines. The bearing shells exhibit a very good interference fit and, even after a long running time at high speeds and temperatures, no noteworthy build-up of oil carbon may be detected on the bearing backing or in the connecting-rod bore.

Other advantages of the thin-walled plain bearing shells are:

good heat dissipation from the plain bearing surface, low connecting-rod bearing weight leads to a reduction in centrifugal forces in high-speed engines, very good workability during manufacture (especially in the case of mass-production), the plain bearing shell causes only slight deformation of the receiving bore through bearing oversize.

In contrast to the prior art, as known for example from DE 33 28 509, U.S. Pat. No. 2,905,511 and GB 256200, it is possible to dispense with complex machining of the bearing backing for the purpose of reducing the wall thickness.

These positive effects first become apparent when $W_{eff}/D$ amounts to $\leq 0.02$. However, the choice as to how thin to make the wall thickness of the bearing shell is not without restriction, since it has been shown that the free spread of the bearing shell must also be taken into consideration, which, from manufacturing points of view, has resulted in a lower limit of $W_{eff}/D=0.012$.

In bearing shell design, it is necessary to take into account the free spread loss through reduction of internal stresses at high temperatures during operation.

It has been shown that the free spread loss is also dependent on the external bearing diameter, the free spread loss diminishing as the diameter diminishes. Therefore, the wall thickness of the bearing shell does not in itself convey any message about free spread loss. For this reason, the effective wall thickness $W_{eff}$ and the ratio $W_{eff}/D$ must be taken into account.

It has emerged that, at temperatures >150° C., a positive free spread (residual free spread) has to be present and must, in the case of an exemplary bearing with an external diameter of D=50.6 mm, be at least approximately 0.5 mm. This minimum residual free spread is necessary to prevent the spring deflection of connecting-rod bearings towards the journal during operation, because otherwise mixed friction occurs in the area of the partial surface owing to a temporary short-term shortage of oil. The consequence thereof would be fatigue and localised wear and finally damage to the bearing. Free spread is determined by simulation tests in a heating furnace.

Furthermore, a free spread loss in the bearing shell arises owing to the machining steps (broaching, drilling etc.) carried out after pressing. The free spread loss caused by metal-cutting machining increases as the wall thickness decreases. The initial free spread achievable by pressing cannot be increased arbitrarily, however, since the bearing shell would no longer be round in shape if free spread were too great. In order to ensure minimum residual free spread, it was found that the ratio of installation free spread S to external bearing diameter D must be within the range from 0.025 to 0.05. These ratios may only be achieved, however, if $W_{eff}/D$ does not go below the lower value of 0.012.

BRIEF DESCRIPTION OF THE DRAWINGS

In the drawings:

FIG. 1 shows bearing shells according to the prior art, installed and under load, FIG. 2 is a diagram in which radial tension is illustrated as a function of temperature and FIG. 3 shows bearing shells according to the invention, installed and under load.

DETAILED DESCRIPTION OF THE PREFERRED EMBODIMENT

| 1st Test | | |
|---|---|---|
| Plain bearing dimensions: | | |
| steel thickness | | 0.76 mm |
| wall thickness | | 1.025 mm |
| effective wall thickness $W_{eff}$ | = | 0.87 mm |
| diameter D | = | 50.6 mm |
| ratio $W_{eff}/D$ | = | 0.017 |
| installation free spread S | = | 1.47 mm |
| S/D | = | 0.029 |
| Radial tension: | | 10.2 N/mm² |
| Test conditions: | | |
| standard connecting rod speed | | 6700 min⁻¹ |
| Oil inlet temperature: | | 100 ° C. |
| Running time: | | 350 hrs |
| Test result: | | |
| residual free spread: | | 0.79 mm |
| residual radial tension: | | 8.5 N/mm² |
| free spread loss: | | 0.68 mm |

| 2nd Test | | |
|---|---|---|
| Plain bearing dimensions: | | |
| steel thickness | | 0.76 mm |
| wall thickness | | 1.025 mm |
| effective wall thickness $W_{eff}$ | = | 0.87 mm |
| diameter D | = | 50.6 mm |
| ratio $W_{eff}/D$ | = | 0.017 |
| installation free spread S | = | 1.6 mm |
| S/D | = | 0.031 |
| Radial tension: | | 9.8 N/mm² |
| Test conditions: | | |
| standard connecting rod speed | | 6700 min⁻¹ |

-continued

| | | |
|---|---|---|
| Oil inlet temperature: | 140 °C. | |
| Running time: | 70 hrs | |
| Test result: | | |
| residual free spread: | 0.5 mm | |
| residual radial tension: | 7.9 N/mm² | |
| free spread loss: | 1.10 mm | |

3rd Test

| | | |
|---|---|---|
| Plain bearing dimensions: | | |
| steel thickness | | 0.50 mm |
| wall thickness | | 0.765 mm |
| effective wall thickness $W_{eff}$ | = | 0.625 mm |
| diameter D | = | 50.6 mm |
| ratio $W_{eff}/D$ | = | 0.012 |
| installation free spread S | = | 0.95 mm |
| S/D | = | 0.018 |
| Radial tension: | | 5.8 N/mm² |
| Test conditions: | | |
| standard connecting rod speed | | 6700 min⁻¹ |
| Oil inlet temperature: | | 100 °C. |
| Running time: | | 250 hrs |
| Test result: | | |
| residual free spread: | | 0.10 mm |
| residual radial tension: | | 4.7 N/mm² |
| free spread loss: | | 0.85 mm |

Appearance of localised cavitation; in the broached-free area the lead-bronze is exposed (presumably as a result of too low a level of residual free spread).

Test result:
residual free spread: 0.10 mm
residual radial tension: 4.7 N/mm²
free spread loss: 0.85 mm Appearance of localised cavitation; in the broached-free area the lead-bronze is exposed (presumably as a result of too low a level of residual free spread).

In the initial state, the press blanks for the bearing shells used in the 3rd test had a free spread of approximately 2.4 mm with a total wall thickness of 0.765 mm. After the manufacturing run, the free spread reduces by 1.4 mm to 0.95 mm.

After the running test, the residual free spread amounted to only 0.1 mm as a result of a reduction in internal stress. In order to obtain adequate residual free spread of 0.5 mm for the bearing shell with D=50.6 mm, the press blank would have to have an initial free spread of approximately 3 mm, which is impossible from the point of view of manufacturing technology.

This 3rd test shows that the bearing shells only exhibit the advantageous characteristics if both parameters $W_{eff}/D$ and S/D are maintained.

On the test stand, in parallel with the test runs, clamping tests were carried out on the thin-walled bearings to investigate the loss of bearing prestress (variation in radial pressure) and the free spread loss, since these values may be directly compared with the test results relating to conventional bearing shells (wall thicknesses 1.4 and 1.8 mm, same bearing geometry).

For the clamping tests, the bearing shells were installed in a connecting rod and then heat-treated in the furnace at constant temperatures ranging from 20° C. and 250° for a period of 20 hours.

FIG. 3 shows the variation in radial pressure as a function of temperature. It has been shown that the bearing prestress (radial pressure) diminishes in linear manner as the temperature increases, wherein the gradient of the straight lines is not very steep and is the same for all bearing dimensions. This means that the relative prestress loss is not dependent on wall thickness.

The prestressing force of the thin-walled bearing shells is, as expected, somewhat lower than is the case with conventional wall thicknesses. In the case of a $W_{eff}/D$ ratio>0.02, a radial pressure of 10 N/mm² is absolutely necessary. In the case of a $W_{eff}/D$ ratio<0.02, on the other hand, a radial pressure of 10 N/mm² is not absolutely necessary, such that it may be assumed that in practice the interference fit is wholly adequate in the case of extremely thin-walled bearing shells.

Since loading depends on the cross-sectional area of the bearing, it follows therefrom that stress increases if the degree of oversize remains constant while wall thickness diminishes. The minimum radial pressure achievable is thus restricted by the material strength of the bearing shell and, for a wall thickness of one millimeter, is below 10 N/mm².

As FIG. 3 shows, the extremely thin-walled bearing shell 2a, 2b may follow the housing deformations better owing to improved adaptation to the receiving bore. The gap 4 between bearing backing and bore 3 is substantially smaller, whereby the build-up of oil carbon is markedly reduced. Complex machining of the bearing backing is thus no longer necessary. At the same time, the improved fit with the housing bore means that lower radial pressure is sufficient as security against rotation than is the case with the conventional bearings according to FIG. 1.

Obviously, many modifications and variations of the present invention are possible in light of the above teachings. It is, therefore, to be understood that within the scope of the appended claim, the invention may be practiced otherwise than as specifically described.

We claim:

1. A plain bearing comprising a metal backing layer and at least one bearing material layer applied to said backing layer, said bearing having a predetermined external bearing diameter D, an effective wall thickness $W_{eff}$, and an installation free spread S, and characterized by the ratio of $W_{eff}/D=0.012 \leq W_{eff}/D \leq 0.02$, and
the ratio of $S/D=0.025 \leq S/D \leq 0.05$.

2. A method of fabricating a plain bearing comprising:

preparing a metal backing layer;

applying at least one bearing material layer to the backing layer to yield a bearing having a predetermined external bearing diameter D, an effective wall thickness $W_{eff}$, and an installation free spread S, and characterized by maintaining the ratio of $W_{eff}/D = 0.012 \leq W_{eff}/D \leq 0.02$ and the ratio of $S/D=0.025 \leq S/D \leq 0.05$.

* * * * *